United States Patent
Eberlein et al.

(10) Patent No.: US 10,185,552 B2
(45) Date of Patent: Jan. 22, 2019

(54) ENFORCING CONTENT CONSTRAINTS ON DELIVERY AND END USER CHANGES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/593,781

(22) Filed: May 12, 2017

(65) Prior Publication Data

US 2018/0329702 A1    Nov. 15, 2018

(51) Int. Cl.
*G06F 8/65*    (2018.01)

(52) U.S. Cl.
CPC .................... *G06F 8/65* (2013.01)

(58) Field of Classification Search
CPC ............... G06F 8/60; G06F 8/61; G06F 8/65
USPC .................................. 717/168–178
See application file for complete search history.

(56) References Cited

U.S. PATENT DOCUMENTS

| | | |
|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,555,249 B2 | 10/2013 | Demant et al. |

(Continued)

OTHER PUBLICATIONS

U.S. Appl. No. 14/960,983, filed Dec. 7, 2015, Eberlein, et al.
U.S. Appl. No. 15/083,918, filed Mar. 29, 2016, Eberlein, et al.
U.S. Appl. No. 15/087,677, filed Mar. 31, 2016, Eberlein, et al.

*Primary Examiner* — Qing Chen
(74) *Attorney, Agent, or Firm* — Fish & Richardson P.C.

(57) ABSTRACT

Methods, systems, and computer-readable storage media for providing a set of key-range-ranges associated with an application, the set of key-range-ranges defining a plurality of key ranges, each key-range-range being assigned to a respective role, determining that a key range is to be defined for the application by a user having a role, determining whether the key range conforms with the set of key-range-ranges and respective roles, accepting the key range at least partially in response to determining that the key range conforms with the set of key-range-ranges and respective roles, and initiating deployment of the application including the key range to a production system.

17 Claims, 7 Drawing Sheets

(56) References Cited

U.S. PATENT DOCUMENTS

| | | | |
|---|---|---|---|
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 2008/0120129 A1 | 5/2008 | Seubert et al. |
| 2010/0153341 A1 | 6/2010 | Driesen et al. |
| 2010/0161648 A1 | 6/2010 | Eberlein et al. |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2016/0219117 A1* | 7/2016 | Marlatt ................ G06F 9/5027 |
| 2017/0025441 A1 | 1/2017 | Mori |
| 2017/0139596 A1* | 5/2017 | Hack ...................... G06F 3/064 |

\* cited by examiner

DELIVERY_KEY_RANGES 300

| TABNAME | APPNAME | RANGENR | RANGE | Range Name |
|---|---|---|---|---|
| MATERIAL | APP1 | 1 | A* | R1 |
| MATERIAL | APP1 | 2 | B* | R1 |
| MATERIAL | APP2 | 1 | G* | R2 |
| MATERIAL | APP2 | 2 | E* | R2 |
| MATERIAL | APP3 | 1 | M* | R3 |
| MATERIAL | APP3 | 2 | N* | R3 |
| MATERIAL | APP3 | 3 | O* | R3 |
| MATERIAL | APP3 | 4 | P* | R3 |
| MATERIAL | CUST | 1 | Y1* | RC1 |

APP_ADMIN 302

| APPNAME | DEV_SYSTEM_NAME | STATUS |
|---|---|---|
| APP1 | C11 | DEPLOYED |
| APP2 | C23 | DEVELOPMENT |
| APP3 | ABC | |
| APP4 | | |
| APP3 | | |

FIG. 3

ENFORCING CONTENT CONSTRAINTS ON DELIVERY AND END USER CHANGES

BACKGROUND

Enterprise systems can include applications executing on application servers, which interact with content (data) stored in database systems. In general, content can be provided by a vendor (e.g., as part of the application delivery, as part of an application add-on), by partners (e.g., non-vendor developers (partners) that develop add-ons to applications), and by users (e.g., users of the application creating their own content). For example, application delivery includes vendor content (default content) that is delivered with the application, and is stored in a database system. If, however, non-vendor content overwrites, for example, default content of the application, a subsequent maintenance procedure performed on the enterprise system (e.g., application upgrade) can be overly burdened. For example, the maintenance procedure may be performed with the expectation that the default content is still present. If the default content has been overwritten, the maintenance procedure would be expanded to analyze for data collisions, and identify the new value(s) of the content. Accordingly, costs, both in terms of time and computing resources required to perform the maintenance procedure, rise as the content has to be merged.

SUMMARY

Implementations of the present disclosure include computer-implemented methods for managing key range definitions in applications. In some implementations, actions include providing a set of key-range-ranges associated with a first application, the set of key-range-ranges defining a plurality of key ranges, each key-range-range being assigned to a respective role, determining that a first key range is to be defined for the first application by a first user having a first role, determining whether the first key range conforms with the set of key-range-ranges and respective roles, accepting the first key range at least partially in response to determining that the first key range conforms with the set of key-range-ranges and respective roles, and initiating deployment of the first application including the first key range to a production system. Other implementations of this aspect include corresponding systems, apparatus, and computer programs, configured to perform the actions of the methods, encoded on computer storage devices.

These and other implementations can each optionally include one or more of the following features: actions further include, during the deployment, determining that a collision exists between the first key range, and a second key range that is associated with the first application and is already deployed to the production system, and in response, halting the deployment; actions further include, during the deployment, determining that a collision is absent between the first key range, and a second key range that is associated with the first application and is already deployed to the production system, and in response, completing the deployment; accepting the first key range is further in response to determining that a collision is absent between the first key range, and a second key range that is associated with the first application; the first role includes a developer of the first application, and the first key range conforms with a key-range-range assigned to developers of the first application; the first application includes an add-on to a second application, the first role comprises a partner to a developer of the first application, and the first key range conforms with a key-range-range assigned to partners of the developer of the first application; and the first role includes a customer to a developer of the first application, and the first key range conforms with a key-range-range assigned to customers of the developer of the first application.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts example tables accordance with implementations of the present disclosure.

Like reference symbols in the various drawings indicate like elements.

DETAILED DESCRIPTION

Implementations of the present disclosure are generally directed to managing key range definitions in applications. More particularly, implementations of the present disclosure provide key-range-ranges for particular roles in application development, as well as key-range, and collision checks during application development. Implementations further provide for, during deployment of an application, collision checks in a production system prior to deploying content to the production system. Implementations can include actions of providing a set of key-range-ranges associated with an application, the set of key-range-ranges defining a plurality of key ranges, each key-range-range being assigned to a respective role, determining that a key range is to be defined for the application by a user having a role, determining whether the key range conforms with the set of key-range-ranges and respective roles, accepting the key range at least partially in response to determining that the key range conforms with the set of key-range-ranges and respective roles, and initiating deployment of the application including the key range to a production system.

Figure 1:
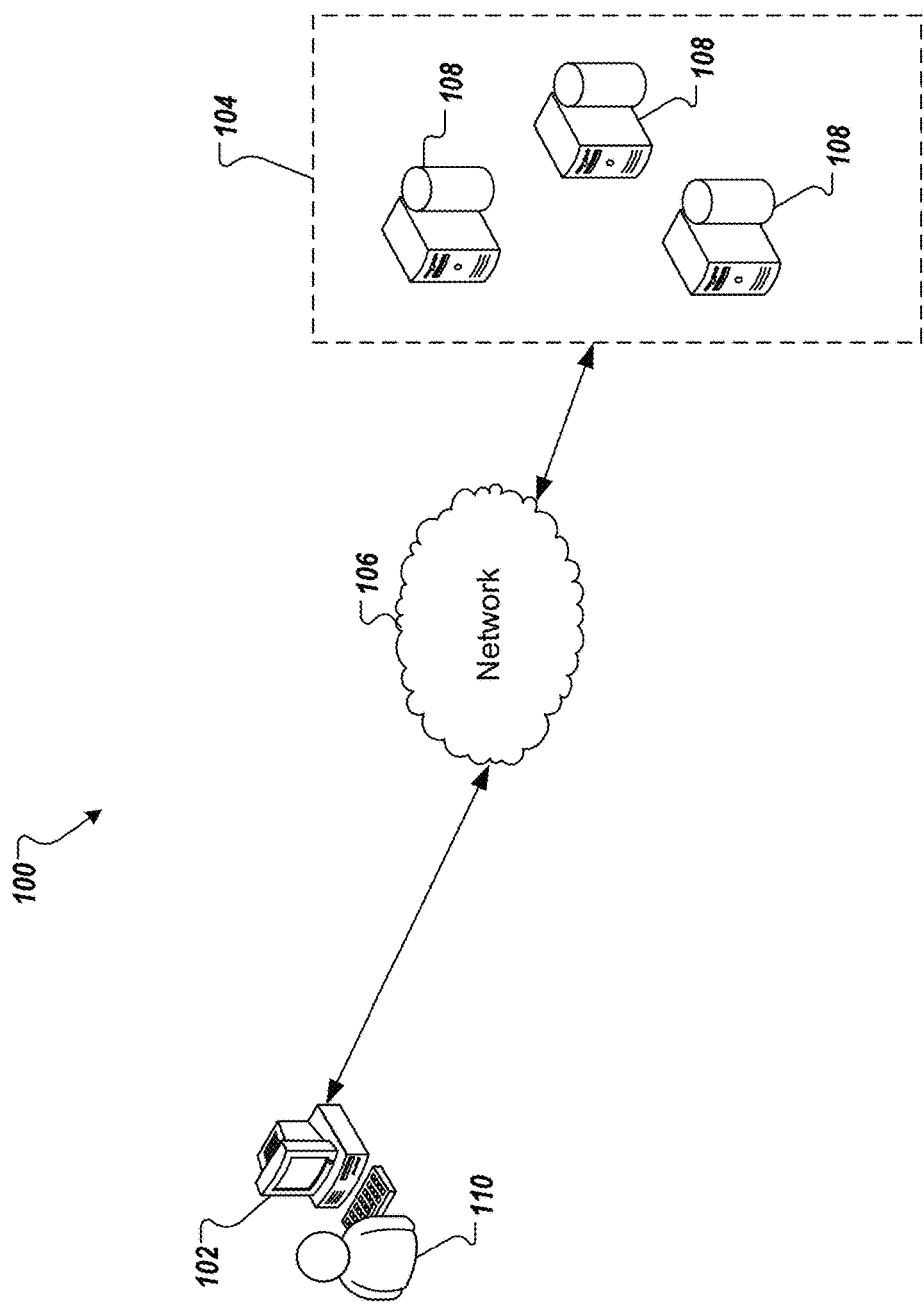
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an application (e.g., provided as one or more computer-executable programs executed by one or more computing devices) that interacts with content (data) stored in a database system. In some examples, the user 110 can use the computing device 102 to develop the application. For example, the user 110 can be a developer of a vendor that provides the application. In some examples, the user 110 can use the computing device 102 to develop an add-on (e.g., separate application) to the application. For example, the user 110 can be a developer of a partner that provides the add-on to the application. In some examples, the user 110 can use the computing device 102 to use the application in production. For example, the user 110 can be an agent of a customer of the vendor that provides the application.

As introduced above, enterprise systems can include applications executing on application servers, which interact with content (data) stored in database systems. In general, content can be provided by a vendor (e.g., as part of the application delivery, as part of an application add-on), by partners (e.g., non-vendor developers that develop add-ons to applications), and by users (e.g., users of the application creating their own content). For example, application delivery includes vendor content (default content) that is delivered with the application, and is stored in a database system. If, however, non-vendor content overwrites, for example, default content of the application, a subsequent maintenance procedure performed on the enterprise system (e.g., application upgrade) can be overly burdened. For example, the maintenance procedure may be performed with the expectation that the default content is still present. If the default content has been overwritten, the maintenance procedure would be expanded to analyze for data collisions, and identify the new value(s) of the content. Accordingly, costs, both in terms of time and computing resources required to perform the maintenance procedure, rise as the content has to be merged.

For the maintenance procedures, having to handle content collisions on key level between delivered content and content modified (e.g., overwritten by an add-on, overwritten by a user) in the enterprise system complicates handling of the content during the maintenance procedure. For example, modifications to the default content have to be detected, rules to be defined as to which entry should be used (e.g., the default content or the modified content), and how to bring up collisions. For zero downtime maintenance (ZDM) procedures, in which downtime of the enterprise system during the maintenance procedure is minimized) a process can include: creating a clone of a table, which will be updated with content by the maintenance procedure to avoid the running application already accessing newly deployed content; installing a database trigger to replicate user data to the clone table; deploying new vendor-provided content to the clone table; and, during a downtime, dropping the original table, and switching to the clone table. With regard to use of the database trigger, content collisions need to be known. For example, if the database trigger overwrites newly deployed content, the content in the target table depends on timing issues (e.g., the deployed content should always be used).

An example ZDM maintenance procedure is disclosed in commonly assigned U.S. application Ser. No. 14/495,056, entitled Zero Downtime Maintenance for Applications and Databases, the disclosure of which is expressly incorporated herein by reference. The example ZDM procedure relies on some conventions to handle delivery of content for database tables. In fact, a non-ZDM maintenance procedure has the same problem. For example, an application in version 1 (App V1) is installed, and default content is provided for a table TAB. A user interacts with the AppV1 to change the content delivery by the application in the table TAB. Once the next maintenance procedure is deployed (e.g., upgrading from version V1 to version V2), the delivery of content will overwrite user settings in the table TAB. Such overwriting is typically considered as a bug in the application. Unfortunately, the overwriting is not detected, until the second release (App V2) is delivered, and users provide feedback (e.g., their content is no longer available).

Even more undesirable scenarios can be realized. For example, the App V1 is installed, and default content for the table TAB is delivered. A user then adds their own content to the table TAB. The application undergoes a maintenance procedure (e.g., upgrade from V1 to V2), which delivers content for the same keys that the user used to add their own content. Consequently, the maintenance procedure is completed, and the user's content is overwritten in the table TAB. Again, such overwriting is typically considered as a bug in the application, and is not detected, until the user provides feedback (e.g., "What happened to all of my data!?").

Problems inherent in enterprise systems can be described based on the following example. An application is delivered in V1, and default content stored to a database system includes a table TAB having a key field F1. The table TAB stores the default content, but also stores content provided by the user. Potentially, the table TAB is used to store content for other vendors (e.g., a vendor that provides an add-on for the application). In this example, App1 is delivered with F1=[A*, B*], and App2 is delivered with F1=[C*, D2*, D3*]. In this example, * indicates a wildcard, which can include any number of alpha-numeric characters. In some examples, App2 can be considered as an add-on to App1, if the table TAB is delivered as part of App1. In some examples, both App1 and App2 can be provided as add-ons on to a platform providing the table TAB.

Continuing with this example, a user of the application enters keys F1=D123, E221. These keys are will not result in any collision during a maintenance procedure, and will not be overwritten during the maintenance procedure. If, however, the end user enters key F1=A121, this key will be overwritten by the deployment of AppV2.

Continuing with this example, for a ZDM procedure, a table will be cloned during the maintenance procedure. For example, a table TAB_NEW will be created. The content of the table TAB is copied to the table TAB_NEW, and a database trigger is installed to update the changes done to the table TAB also to the table TAB_NEW. If the content has been deployed to the table TAB_NEW, and the user changes the content, the outcome of the maintenance procedure depends on the exact timing of the two events. For example, if the user changes the entries, then content deployment occurs, content included in the delivery is used. However, if the content deployment is performed, then the user changes the entries, the user-provided content is used. This behavior, however, is undesirable, as it should be ensured that, after the maintenance, the deployed content is in the database system.

In view of the foregoing, implementations of the present disclosure are directed to a key-range management system, which enables key-range-ranges to be defined and enforced. In accordance with implementations of the present disclosure, and as described in further detail herein, the key-range-ranges are used to organize different entities, who may store content (e.g., vendor, partners, users). Within each key-range range (e.g., a partner key range), the application developer (e.g., add-on developer) can define their own sub-range. Upon definition of a sub-range range, it is verified that the sub-range resides in the respective key-range-range (e.g., partner key range), and it is checked that the range definition does not collide with other known range definitions. This is the same for vendor, partner and user (only the key-range-range is different). In this manner, it can be assured that there are no collisions with known ranges.

While developing an application, a system can be defined as a development system for a certain application (or add-on, or user extension). If table entries are altered in a system, it is checked whether the keys are in the key-range-ranges defined for the application. It is also checked whether the system that is used to alter the entries is defined as a development system for the application whose entries are to be modified. In this manner, it is ensured that the application itself is consistently developed, and changes are not done in different systems which can lead to conflicts. When deploying the application to a system (e.g., to an application server of a production system), the key-range-ranges defined by the application are checked to determine whether other applications deployed on the application server already use these key ranges. In this manner, it is ensured that the application does not collide with ranges unknown earlier (e.g., unknown during development of the application).

Implementations of the present disclosure are described in further detail herein with reference to an illustrative example including an application having example key-range-ranges. This illustrative example is described with reference to FIGS. 2A, 2B, and 3.

Figure 2A:
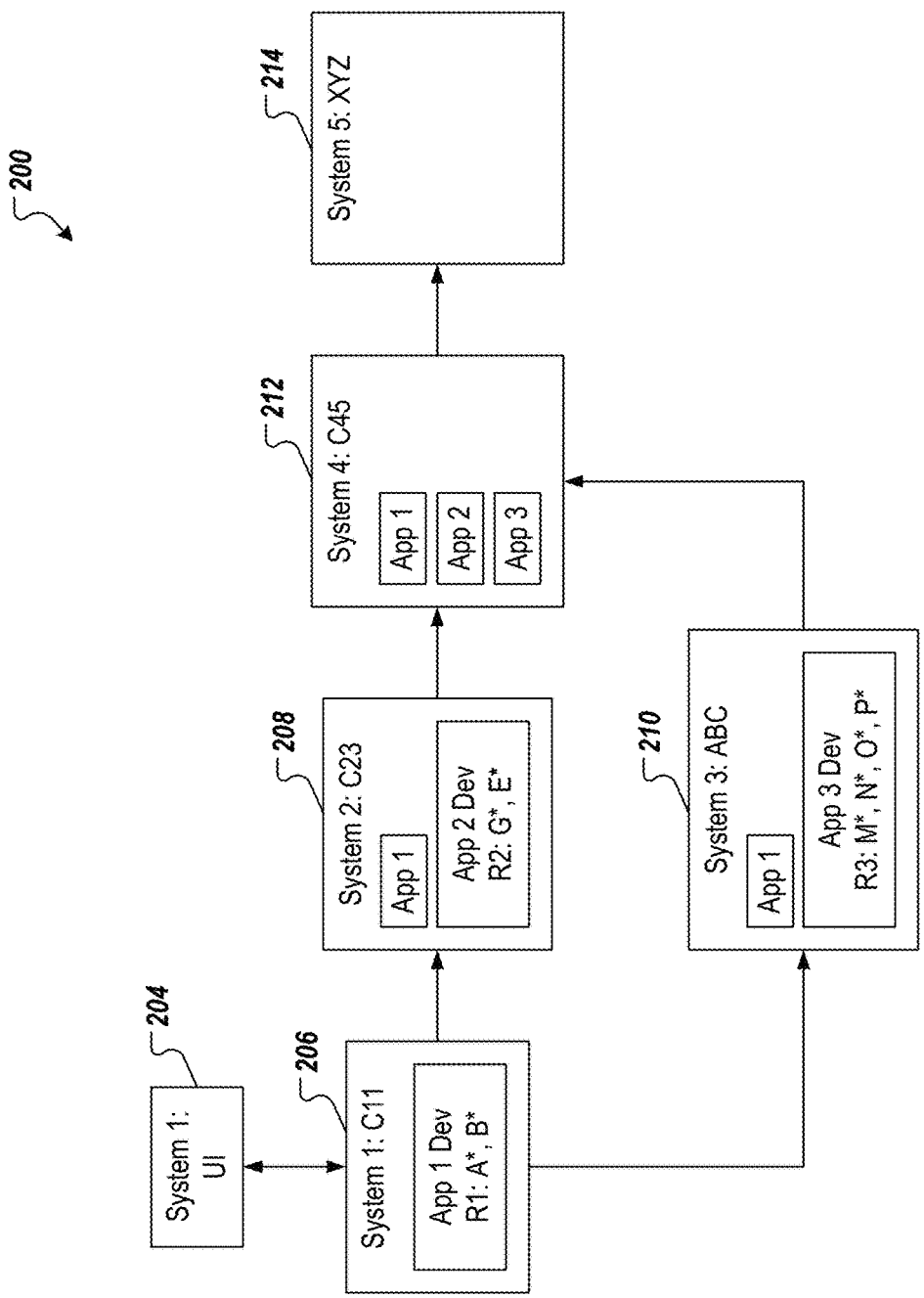
FIGS. 2A-2C depict example conceptual architectures in accordance with implementations of the present disclosure.
Figure 2B:
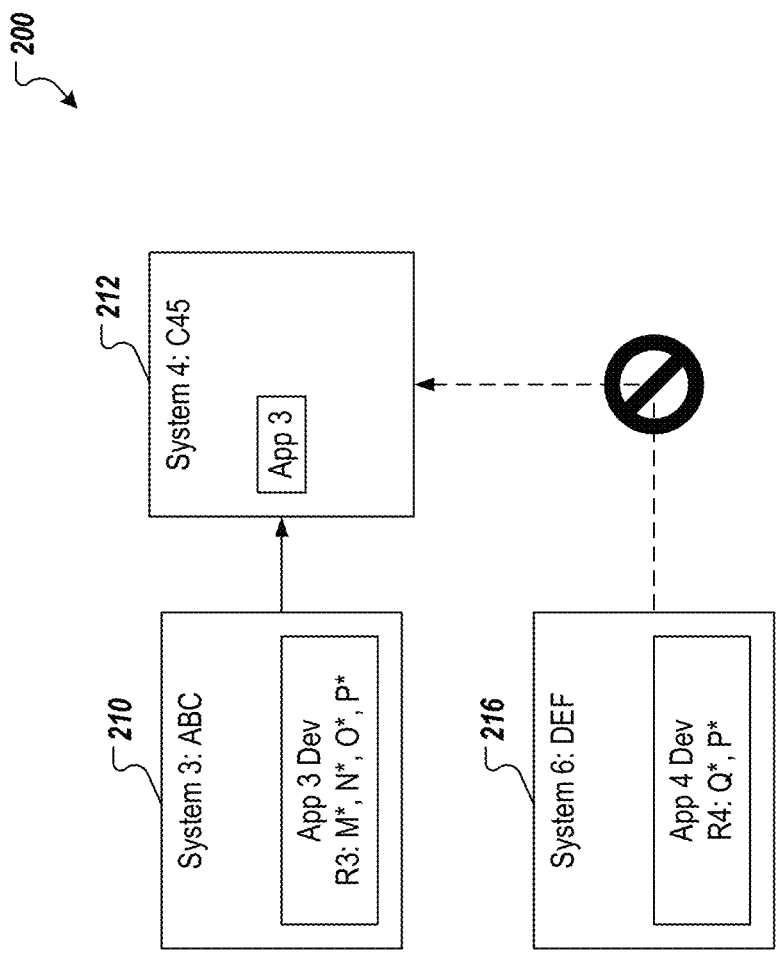
Figure 2C:
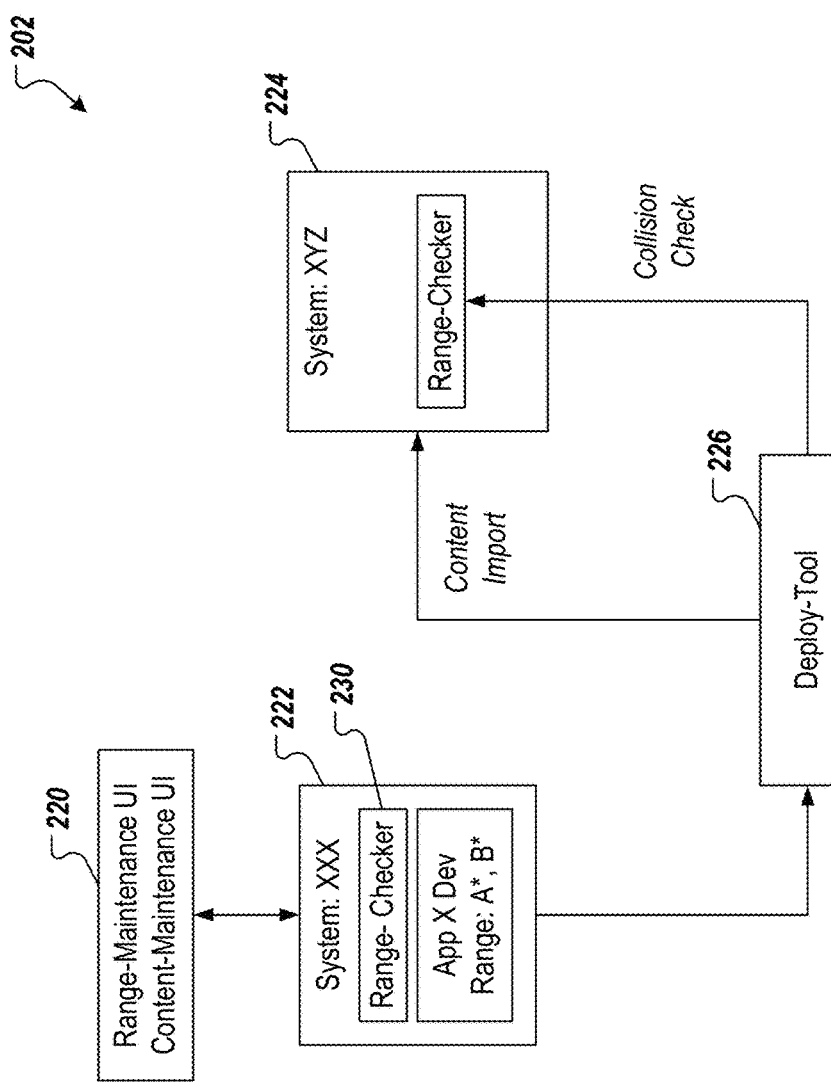

FIGS. 2A-2C depict example conceptual architectures 200, 202, respectively, in accordance with implementations of the present disclosure. With particular reference to FIG. 2A, the example conceptual architecture 200 includes a user interface (UI) 204, a development system 206, a development system 208, a development system 210, a consolidation system 212, and a production system 214. The UI 204 enables user interactions with the development system 206.

In the illustrative example, an application (App1) is developed using the development system 206, and has the following example key-range-ranges defined for a key F1: vendor [A-F] (e.g., the developer of the application); partner [G-X] (e.g., developers of add-ons to the application); and user [Y-Z] (e.g., the user of the application). At delivery, the application App1 delivers key ranges F1=[A*, B*] for a particular table (e.g., TABNAME=MATERIAL). This range is defined as R1.

With reference to FIG. 3, a delivery key ranges table 300 records the range information. Further, an application administration table 302 records information associated with application development, and status. In the depicted example, upon deployment of the application App1, the table 302 records that App1 was developed by the development system C11 (i.e., the development system 206 of FIG. 2A), and that App1 has been deployed.

An add-on application (App2) is provided by a partner, and is developed using the development system 208 of FIG. 2A. In this example, App2 delivers key ranges F1=[G*, E*]. This range is defined as R2, and is added to the table 300. In the example of FIG. 3, the table 302 records the status of App2 as in development. The table 302 of FIG. 3 is a snapshot of what would be recorded, while App2 undergoes development in the development system 208, after deployment of App1.

Another add-on application (App3) is provided by a partner, and is developed using the development system 210 of FIG. 2A. In this example, App3 delivers key ranges F1=[M*, N*, O*, P*]. This range is defined as R3, and is added to the table 300. In the example of FIG. 3, the table 302 records the existence of App3. The consolidation system 212 tests whether App1, App2, and App3 can be deployed together (e.g., no collisions), as described herein With reference to FIG. 2B, another add-on application (App4) is provided by a partner, and delivers key ranges F1=[Q*, P*]. This range is defined as R4. A user of App1 defines the key range F1=[Y1*] for its own use. This range is defined as RC1, and is recorded in the table 300.

In the development system of App2 (i.e., the development system 208 of FIG. 2A), the maintenance of content is checked for the range R2. For example, entering a key G12 is possible, because the key G12 lies within the key-range defined for partners (i.e., [G-X]). However, entering a key A3 is not possible, because the key A3 lies within the key-range defined for the vendor of App1 (i.e., [A-F]), to which App2 is an add-on. In a test system of App2, the maintenance of content is checked. For example, entering the key G12 is not possible, because App2 is now in the test system, and not the development system. Further, entering the key A3 is not possible. However, entering a key Z* is allowed, because this is an activity that a user might perform, and the key Z* lies within the key-range defined for users (i.e., [Y-Z]). In the development system of App3, the developer (partner) cannot define a range R3 as F1=[F*], because this violates the key-range for add-ons (i.e., [G-X]). However, the developer of App3 can define a range R3 as F1=[M*, N*, O*, P*], because this conforms with the key-range for add-ons (i.e., [G-X]).

Upon deployment of App1 and App2 to an application server, the ranges R1 and R2 are checked, and no collision is found. Consequently, the deployment of App1 and App2 can be performed. Upon deployment of App3 to the same application server (e.g., subsequent to deployment of App1 and App2), the range R3 is checked against the ranges R1 and R2, and no collision is found. Consequently, the deployment of App3 can be performed. Upon deployment of App4 to the same application server (e.g., subsequent to the deployment of App1, App2, and App3), the range R4 is checked against the ranges R1, R2, and R3. In this example, an overlap of the ranges R3 and R4 is detected (both R3 and R4 use P*). Consequently, the deployment of App4 is aborted (as graphically depicted in FIG. 2B). Hence, the range R4 is not recorded in the table 300 of FIG. 3. In some examples, in response, the developer of App4 is informed of the collision (overlap) (e.g., an error message is displayed), such that the developer can fix the range to obviate the overlap, then again attempt to deploy.

Continuing with this example, the user has a development system, and a production system. The user defines a key range F1=[Y1*] in the development system, which is defined as the range RC1. Inserting a key Y12 is allowed, because it conforms with the key defined by the user, as well as the key-range reserved for users (i.e., [Y-Z]). However, inserting a key Y23 return an error. Although the key Y23 is in the key-range reserved for users (i.e., [Y-Z]), it is not in the key range defined by the user (i.e., F1=[Y1*]). Further, inserting a key M12 returns an error, as it collides with the key-range of App3 (i.e., F1=[M*, N*, O*, P*]).

The user deploys the change created in the development system to the production system. The range RC1 is checked (compared to the other ranges), and it is determined that the range RC1 does not collide with the others. Consequently, the deployment of the changes is performed. During production use, changes such as inserting entries in the table MATERIAL with a key Y1 does not work, as it collides with RC1 that was already defined in the development system. In the production system, however, the user can define in a key in a range that is open for insertion (e.g., F1=[Y9*]). Upon deploying a development created in the user's development system, the ranges are guaranteed to not overwrite keys created in the production system. Consequently, there is no need for double maintenance (e.g., also doing the changes done in the production system later in the development system to ensure the next deployment from the development system does not overwrite content).

With particular reference to FIG. 2C, a high-level workflow will be described in detail. In the depicted example, the conceptual architecture 202 includes a range-maintenance-/content-maintenance-UI 220, a development system 222, and a production system 224. An application AppX is developed using the development system 222, and is deployed to the production system 224 by a deployment tool 226. The UI 220 enables a user to define a key range for App2. In the depicted example, the keys are defined as A*, B*. A range-checker 230 of the development system 222 checks the defined key ranges against any already defined key ranges for the AppX. If there is no collision, the defined key range is entered for the AppX. If there is a collision (e.g., the key range is reserved for a partner), an error is displayed, and the user can define an alternative key range.

Upon deployment, content of the AppX is exported to the production system 224 by the deployment tool 226. Further, range definitions are also exported. In importing the content to the production system 224, the deployment tool 226 performs a key range check to determine whether the imported keys collide with key ranges already defined for the production system 224. If, for example, a previous deployment to the production system 224 already defined A*, and a current deployment to the production system 224 indicates that A* is to be included, a collision exits. Consequently, the import is aborted, and the range definition is revised in the development system 222 (e.g., change A* to something else that is not already present in the production system 224). If there are no collisions, or all collisions are remedied, the content is imported to the production system 224 without requiring range checks.

Figure 4:
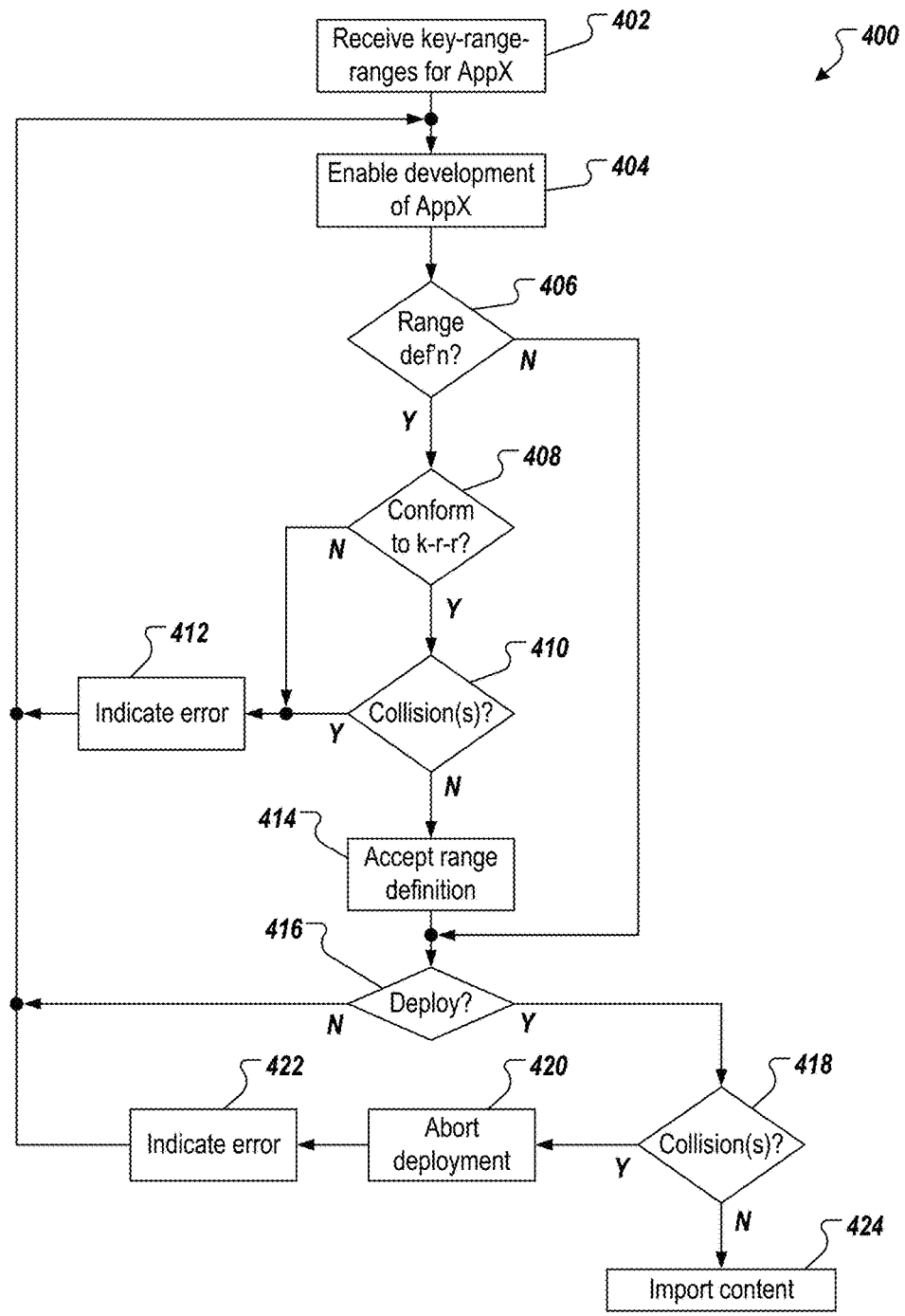
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

A plurality of key-range-ranges for an application (AppX) is received (402). For example, the developer of AppX provides example key-range-ranges defined for a key F1: vendor [A-F] (e.g., the developer of the application); partner [G-X] (e.g., developers of add-ons to the application); and user [Y-Z] (e.g., the user of the application), as described herein. In some examples, the developer of AppX can deliver AppX with a key range F1=[A*, B*] for a particular table (e.g., TABNAME=MATERIAL), which range is defined as R1. Development of AppX is enabled (404). For example, the developer provides (delivers) the application to customers, and/or developers of add-on applications to AppX.

It is determined whether a range is being defined for AppX (406). For example, the developer can develop an add on including a range F1=[G*, E*], which can be defined as R2. If a range definition is being provided, the example process 400 proceeds to determine whether the application (e.g., add-on) is to be deployed (416). If a range definition does exist, it is determined whether the range definition conforms to the key-range-ranges defined for AppX (408). If the range definition does not conform to the key-range-ranges defined for AppX, an error is indicated (412), and the example process loops back. In this manner, the developer (e.g., of an add-on) can change the range definition, such that the range definition conforms to the key-range-ranges defined for AppX.

If the range definition conforms to the key-range-ranges defined for AppX, it is determined whether there are any collisions (overlap) with any previously defined ranges (410). For example, it is determined whether the range definition collides with an already deployed add-on to AppX. If there is a collision, an error is indicated (412), and the example process loops back. If there is not a collision, the range definition is accepted (414), and it is determined whether the application (e.g., add-on) is to be deployed (416). If the application is not to be deployed (e.g., development is to continue), the example process 400 loops back. If the application is to be deployed, a deploy tool deploys the application to a production system, and determined whether there are any collisions (overlap) with key ranges being used in the production system (418). If there is a collision, the deployment is aborted (420), an error is indicated (422), and the example process 400 loops back. If there are no collisions, the deployment is completed, and content is imported to the production system (424).

Implementations of the present disclosure provide one or more of the following example advantages. In some examples, implementations enable independent development of applications providing content for the same platform table, and ensures that the deployment of the applications is independent with respect to the content provided. In some examples, the deployment of one application does not interfere or invalidate the deployment of another application. Implementations further ensure that content is created in a dedicated development system for the application, and cannot be modified by developers of another application or user of these applications in another system. Implementations of the present disclosure do not rely on a central infrastructure, and is thus suited for community development. It is also ensured that customers of a set of applications can define their own content, which does not collide with application content. Implementations further ensure that even a future version of the applications do not collide with customer-created content. Further, implementations of the present disclosure enable management of content created by a consumer in one system being deployed to another system, the second system ensuring content cannot be modified. In this manner, there is thus no interference when a new version of content created by the consumer is deployed to the second system (typically a production system).

Figure 5:
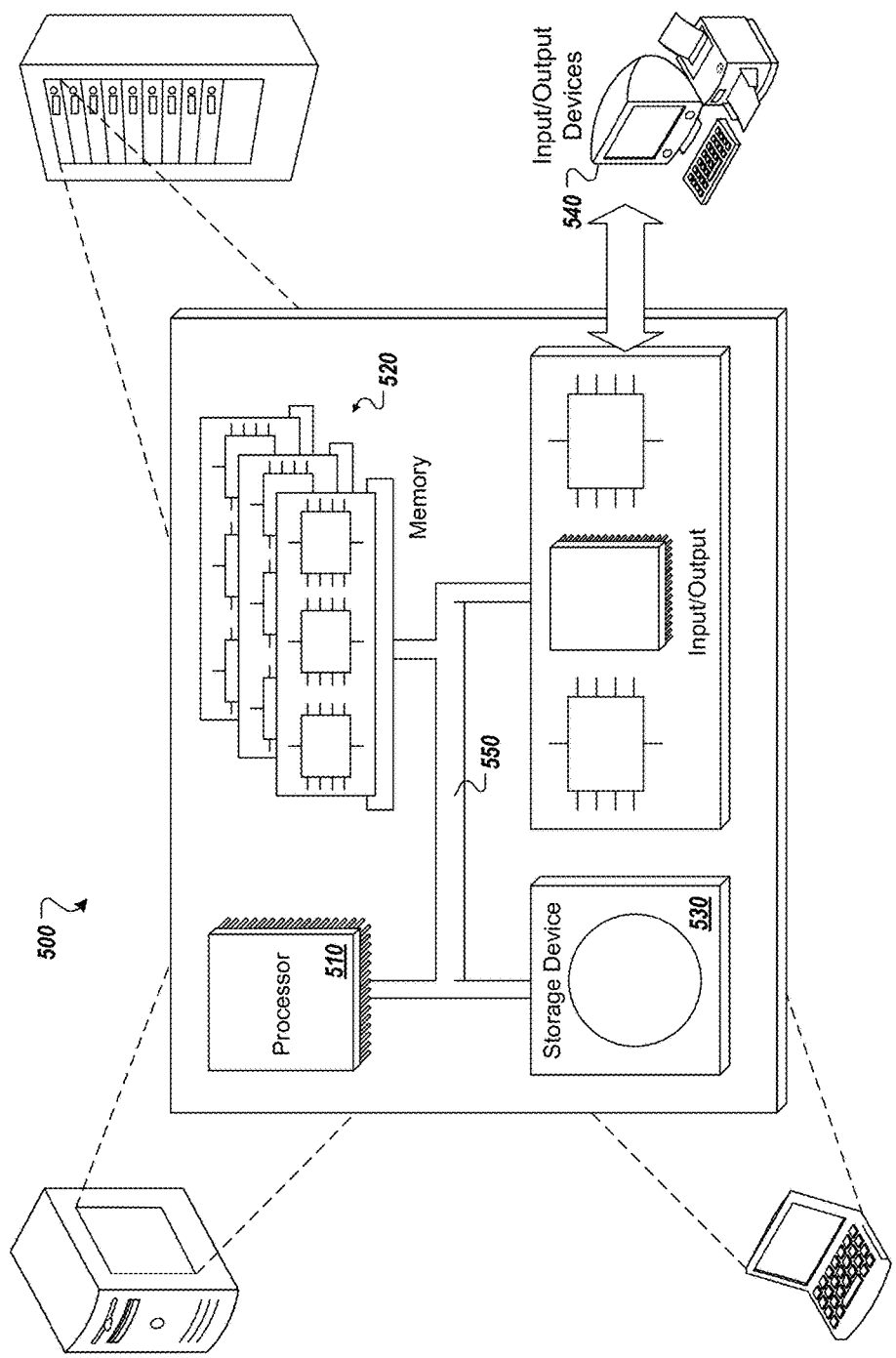
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing key range definitions in applications, the computer-implemented method being executed by one or more processors and comprising:
    delivering, by the one or more processors, a first application with a set of key-range-ranges defined for the first application, the set of key-range-ranges defining a plurality of key ranges for the first application, each key-range-range defined for the first application being assigned to a respective role;
    receiving, by the one or more processors, a user input defining a first key range for the first application from a first user having a first role;
    determining, by a range-checker executed by the one or more processors, whether the first key range for the first application conforms with the set of key-range-ranges defined for the first application and respective roles;
    accepting, by the range-checker executed by the one or more processors, the first key range for the first application at least partially in response to determining that the first key range for the first application conforms with the set of key-range-ranges defined for the first application and respective roles, wherein accepting the first key range for the first application is further in response to determining that a collision is absent between the first key range for the first application and a second key range for the first application; and
    initiating, by the one or more processors, deployment of the first application including the first key range for the first application to a production system.

2. The computer-implemented method of claim 1, further comprising, during the deployment, determining that a collision exists between the first key range for the first application and the second key range for the first application and the first application is already deployed to the production system, and in response, halting the deployment of the first application.

3. The computer-implemented method of claim 1, further comprising, during the deployment, determining that a collision is absent between the first key range for the first application and the second key range for the first application and the first application is already deployed to the production system, and in response, completing the deployment of the first application.

4. The computer-implemented method of claim 1, wherein the first role comprises a developer of the first application, and the first key range for the first application conforms with a key-range-range defined for the first application assigned to developers of the first application.

5. The computer-implemented method of claim 1, wherein the first application comprises an add-on to a second application, the first role comprises a partner to a developer of the first application, and the first key range for the first application conforms with a key-range-range defined for the first application assigned to partners of the developer of the first application.

6. The computer-implemented method of claim 1, wherein the first role comprises a customer to a developer of the first application, and the first key range for the first application conforms with a key-range-range defined for the first application assigned to customers of the developer of the first application.

7. A non-transitory computer-readable storage medium coupled to one or more processors and having instructions stored thereon which, when executed by the one or more processors, cause the one or more processors to perform operations for managing key range definitions in applications, the operations comprising:
    delivering a first application with a set of key-range-ranges defined for the first application, the set of key-range-ranges defining a plurality of key ranges for the first application, each key-range-range defined for the first application being assigned to a respective role;
    receiving a user input defining a first key range for the first application from a first user having a first role;
    determining, by a range-checker executed by the one or more processors, whether the first key range for the first application conforms with the set of key-range-ranges defined for the first application and respective roles;
    accepting, by the range-checker executed by the one or more processors, the first key range for the first application at least partially in response to determining that the first key range for the first application conforms with the set of key-range-ranges defined for the first application and respective roles, wherein accepting the first key range for the first application is further in response to determining that a collision is absent between the first key range for the first application and a second key range for the first application; and
    initiating deployment of the first application including the first key range for the first application to a production system.

8. The non-transitory computer-readable storage medium of claim 7, wherein operations further comprise, during the deployment, determining that a collision exists between the first key range for the first application and the second key range for the first application and the first application is already deployed to the production system, and in response, halting the deployment of the first application.

9. The non-transitory computer-readable storage medium of claim 7, wherein operations further comprise, during the deployment, determining that a collision is absent between the first key range for the first application and the second key range for the first application and the first application is already deployed to the production system, and in response, completing the deployment of the first application.

10. The non-transitory computer-readable storage medium of claim 7, wherein the first role comprises a developer of the first application, and the first key range for the first application conforms with a key-range-range defined for the first application assigned to developers of the first application.

11. The non-transitory computer-readable storage medium of claim 7, wherein the first application comprises an add-on to a second application, the first role comprises a partner to a developer of the first application, and the first key range for the first application conforms with a key-range-range defined for the first application assigned to partners of the developer of the first application.

12. The non-transitory computer-readable storage medium of claim 7, wherein the first role comprises a customer to a developer of the first application, and the first key range for the first application conforms with a key-range-range defined for the first application assigned to customers of the developer of the first application.

13. A system, comprising:
a computing device; and
a non-transitory computer-readable storage device coupled to the computing device and having instructions stored thereon which, when executed by the computing device, cause the computing device to perform operations for managing key range definitions in applications, the operations comprising:
  delivering a first application with a set of key-range-ranges defined for the first application, the set of key-range-ranges defining a plurality of key ranges for the first application, each key-range-range defined for the first application being assigned to a respective role;
  receiving a user input defining a first key range for the first application from a first user having a first role;
  determining, by a range-checker executed by the one or more processors, whether the first key range for the first application conforms with the set of key-range-ranges defined for the first application and respective roles;
  accepting, by the range-checker executed by the one or more processors, the first key range for the first application at least partially in response to determining that the first key range for the first application conforms with the set of key-range-ranges defined for the first application and respective roles, wherein accepting the first key range for the first application is further in response to determining that a collision is absent between the first key range for the first application and a second key range for the first application; and
  initiating deployment of the first application including the first key range for the first application to a production system.

14. The system of claim 13, wherein operations further comprise, during the deployment, determining that a collision exists between the first key range for the first application and the second key range for the first application and the first application is already deployed to the production system, and in response, halting the deployment of the first application.

15. The system of claim 13, wherein operations further comprise, during the deployment, determining that a collision is absent between the first key range for the first application and the second key range for the first application and the first application is already deployed to the production system, and in response, completing the deployment of the first application.

16. The system of claim 13, wherein the first role comprises a developer of the first application, and the first key range for the first application conforms with a key-range-range defined for the first application assigned to developers of the first application.

17. The system of claim 13, wherein the first application comprises an add-on to a second application, the first role comprises a partner to a developer of the first application, and the first key range for the first application conforms with a key-range-range defined for the first application assigned to partners of the developer of the first application.

* * * * *